US009153230B2

(12) United States Patent
Maaninen

(10) Patent No.: US 9,153,230 B2
(45) Date of Patent: Oct. 6, 2015

(54) MOBILE SPEECH RECOGNITION HARDWARE ACCELERATOR

(71) Applicant: GOOGLE INC., Mountain View, CA (US)

(72) Inventor: Juha-Pekka Maaninen, Oulu (FI)

(73) Assignee: Google Inc., Mountain View, CA (US)

( * ) Notice: Subject to any disclaimer, the term of this patent is extended or adjusted under 35 U.S.C. 154(b) by 401 days.

(21) Appl. No.: 13/658,654

(22) Filed: Oct. 23, 2012

(65) Prior Publication Data

US 2015/0199963 A1 Jul. 16, 2015

(51) Int. Cl.
*G10L 21/00* (2013.01)
*G10L 15/16* (2006.01)
*G10L 15/28* (2013.01)

(52) U.S. Cl.
CPC ............ *G10L 15/16* (2013.01); *G10L 15/28* (2013.01)

(58) Field of Classification Search
CPC .......... G10L 15/28; G10L 15/16; G10L 25/30
See application file for complete search history.

(56) References Cited

U.S. PATENT DOCUMENTS

| | | | | | |
|---|---|---|---|---|---|
| 4,651,289 | A | * | 3/1987 | Maeda et al. | 704/244 |
| 5,167,008 | A | * | 11/1992 | Engeler | 706/43 |
| 5,349,687 | A | * | 9/1994 | Ehlig et al. | 704/231 |
| 5,422,983 | A | * | 6/1995 | Castelaz et al. | 706/42 |
| 5,790,754 | A | * | 8/1998 | Mozer et al. | 704/232 |
| 5,892,962 | A | * | 4/1999 | Cloutier | 712/16 |
| 6,199,057 | B1 | * | 3/2001 | Tawel | 706/30 |
| 6,311,265 | B1 | * | 10/2001 | Beckerle et al. | 712/203 |
| 6,832,194 | B1 | * | 12/2004 | Mozer et al. | 704/270 |
| 7,082,419 | B1 | * | 7/2006 | Lightowler | 706/15 |
| 8,081,816 | B1 | * | 12/2011 | Irick et al. | 382/156 |
| 2003/0120363 | A1 | * | 6/2003 | Luo et al. | 700/48 |
| 2008/0232682 | A1 | * | 9/2008 | Eswaran | 382/159 |
| 2008/0319933 | A1 | * | 12/2008 | Moussa et al. | 706/31 |
| 2010/0076915 | A1 | * | 3/2010 | Xu et al. | 706/25 |
| 2010/0312735 | A1 | * | 12/2010 | Knoblauch | 706/25 |

OTHER PUBLICATIONS

Skoda, Peter, et al. "Implementation Framework for Artificial Neural Networks on FPGA." MIPRO, 2011 Proceedings of the 34th International Convention. IEEE, 2011.*
Farber, Philipp, and Krste Asanovic. "Parallel neural network training on Multi-Spert." Algorithms and Architectures for Parallel Processing, 1997. ICAPP 97., 1997 3rd International Conference on. IEEE, 1997.*
Farabet, Clément, et al. "Hardware accelerated convolutional neural networks for synthetic vision systems." Circuits and Systems (ISCAS), Proceedings of 2010 IEEE International Symposium on. IEEE, 2010.*
Liao, Yihua. "Neural networks in hardware: A survey." Department of Computer Science, University of California (2001).*

(Continued)

*Primary Examiner* — Brian Albertalli
(74) *Attorney, Agent, or Firm* — Brake Hughes Bellermann LLP

(57) ABSTRACT

A method for executing a mobile speech recognition software application based on a multi-layer neural network model includes providing to a hardware accelerator in the mobile device to classify one or more frames of an audio signal. The hardware accelerator includes a multiplier-accumulator (MAC) unit to perform matrix multiplication operations involved in computing the neural network output.

31 Claims, 7 Drawing Sheets

(56) References Cited

OTHER PUBLICATIONS

Nomura, Osamu, et al. "A convolutional neural network VLSI architecture using sorting model for reducing multiply-and-accumulation operations." Advances in Natural Computation. Springer Berlin Heidelberg, 2005. 1006-1014.*

Ahmadi, A., et al. "A low-cost fault-tolerant approach for hardware implementation of artificial neural networks." Computer Engineering and Technology, 2009. ICCET'09. International Conference on. vol. 2. IEEE, 2009.*

Farmahini-Farahani, Amin, Sied Mehdi Fakhraie, and Saeed Safari. "Scalable architecture for on-chip neural network training using swarm intelligence." Proceedings of the conference on Design, automation and test in Europe. ACM, 2008.*

Savich, Antony W., Medhat Moussa, and Shawki Areibi. "The impact of arithmetic representation on implementing MLP-BP on FPGAs: A study." Neural Networks, IEEE Transactions on 18.1 (2007): 240-252.*

Esmaeilzadeh, Hadi, et al. "Neural network stream processing core (NnSP) for embedded systems." Circuits and Systems, 2006. ISCAS 2006. Proceedings. 2006 IEEE International Symposium on. IEEE, 2006.*

Stelling, Paul F., and Vojin G. Oklobdzija. "Implementing multiply-accumulate operation in multiplication time." Computer Arithmetic, 1997. Proceedings., 13th IEEE Symposium on. IEEE, 1997.*

Botros, Nazeih M., and M. Abdul-Aziz. "Hardware implementation of an artificial neural network." Neural Networks, 1993., IEEE International Conference on. IEEE, 1993.*

Washburne, T. P., et al. "The Lockheed probabilistic neural network processor." Neural Networks for Ocean Engineering, 1991., IEEE Conference on. IEEE, 1991.*

Savran, Aydoğan, and Serkan Ünsal. "Hardware Implementation of a Feed forward Neural Network Using FPGAs." The third International Conference on Electrical and Electronics Engineering (ELECO 2003). 2003.*

Nedjah, Nadia, et al. "Dynamic MAC-based architecture of artificial neural networks suitable for hardware implementation on FPGAs." Neurocomputing 72.10 (2009): 2171-2179.*

\* cited by examiner

MOBILE SPEECH RECOGNITION HARDWARE ACCELERATOR

TECHNICAL FIELD

This disclosure generally relates to applications for mobile computing devices.

BACKGROUND

Mobile and connected devices (e.g., smart phones, tablets, etc.), which provide Internet connectivity to device users on the move, are transforming patterns of social and business behavior. Consumers are increasingly integrating mobile behaviors into their lifestyles. There is a growing use of mobile applications, not merely mobile search browsers, for diverse purposes including receiving varied information and communications.

Mobile speech recognition applications are of interest not only for purposes such as dictation or interactive learning for which traditional desktop speech recognition applications are available, but also for the potential use of speech as commands to access or interact with mobile device features, applications, services and content. However, developing reliable speech-activated applications and services for mobile devices is a greater challenge than developing desktop-based or server-based speech recognition applications. Mobile speech recognition applications with client-side processing of computational-intensive speech recognition algorithms may be impractical because of the limited-capability CPUs used in traditional mobile devices. Mobile speech recognition solutions with server-side processing implementations may suffer from long latency periods due to the inherent limitations of mobile device use, such as inconsistent connection quality and background noise.

Consideration is now being given to the speech recognition accuracy and the complexity of speech recognition applications that can be delivered on a mobile device.

SUMMARY

A mobile speech recognition software application utilizes a client-side implementation of a neural network as an acoustic model.

In a general aspect, a mobile computing device includes a processor configured to execute a mobile speech recognition software application that uses a multi-layered neural network as an acoustic model. The processor is coupled to a hardware accelerator, which performs computationally-intensive neural network calculations for classifying audio or speech input. The speech recognition software application provides configuration settings for the hardware accelerator as well as provides bitstreams of compressed or uncompressed weights and bias terms for the neural network calculations to the hardware accelerator.

In a general aspect, the hardware accelerator includes circuitry configured to receive matrix data representing one or more frames of an audio signal as input data for a first layer of the neural network, and a multiplier-accumulator (MAC) unit to carry out matrix multiplication, add and accumulate operations. The hardware accelerator further includes circuitry configured to pass the accumulated results through an activation function to generate an output matrix representing an output of the first layer of the neural network.

In another aspect, the hardware accelerator includes data transceiver circuitry configured to receive and decode compressed or uncompressed weights and bias terms data, which may streamed to it by the mobile speech recognition application. The transceiver circuitry may include decompression circuitry configured to decompress any compressed weights and bias terms data that are streamed to it by the mobile speech recognition application. The data transceiver circuitry is configured to transmit uncompressed or decompressed weighing matrix coefficients and bias coefficients data on a first in first out basis via a FIFO register to the MAC unit.

In another aspect, the hardware accelerator is configured to feed the output of the first layer of the neural network for the frame as input data for a next layer of the neural network, and raise an interrupt after computing all layers of the neural network for the input matrix data representing one or more frames of the audio signal.

In yet another aspect, the hardware accelerator is implemented as an Application Specific Integrated Circuit (ASIC) core, or alternatively as a field-programmable gate array (FPGA).

In a general aspect, a method for executing a speech recognition software application on a mobile device includes utilizing a hardware accelerator in the mobile device to perform neural network calculations to classify an audio signal. Utilizing the hardware accelerator includes sending matrix data representing one or more frames of an audio signal as input data for a first layer of a neural network to the hardware accelerator, and using a multiplier-accumulator (MAC) unit in the hardware accelerator to perform multiply-accumulate operations. The multiply-accumulate operations include multiplying the received matrix data representing one or more frames of the audio signal with a weight matrix, adding a bias matrix to the multiplication results, and accumulating the addition results. The method further includes using circuitry in the hardware accelerator to pass the accumulated results through an activation function to generate an output matrix representing an output of the first layer of the neural network.

In another aspect, the method includes streaming compressed or uncompressed weight and bias terms data to the hardware accelerator, and using decompression circuitry in the hardware accelerator to decompress any compressed weights and bias terms data received from the data streaming unit. The method includes double buffering the decompressed weights and bias terms data to allow for parallel decompression and MAC unit operations. Alternatively, in the method, the decompressed weights and bias terms data may be delivered to the MAC unit on a first in first out basis via a FIFO register.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
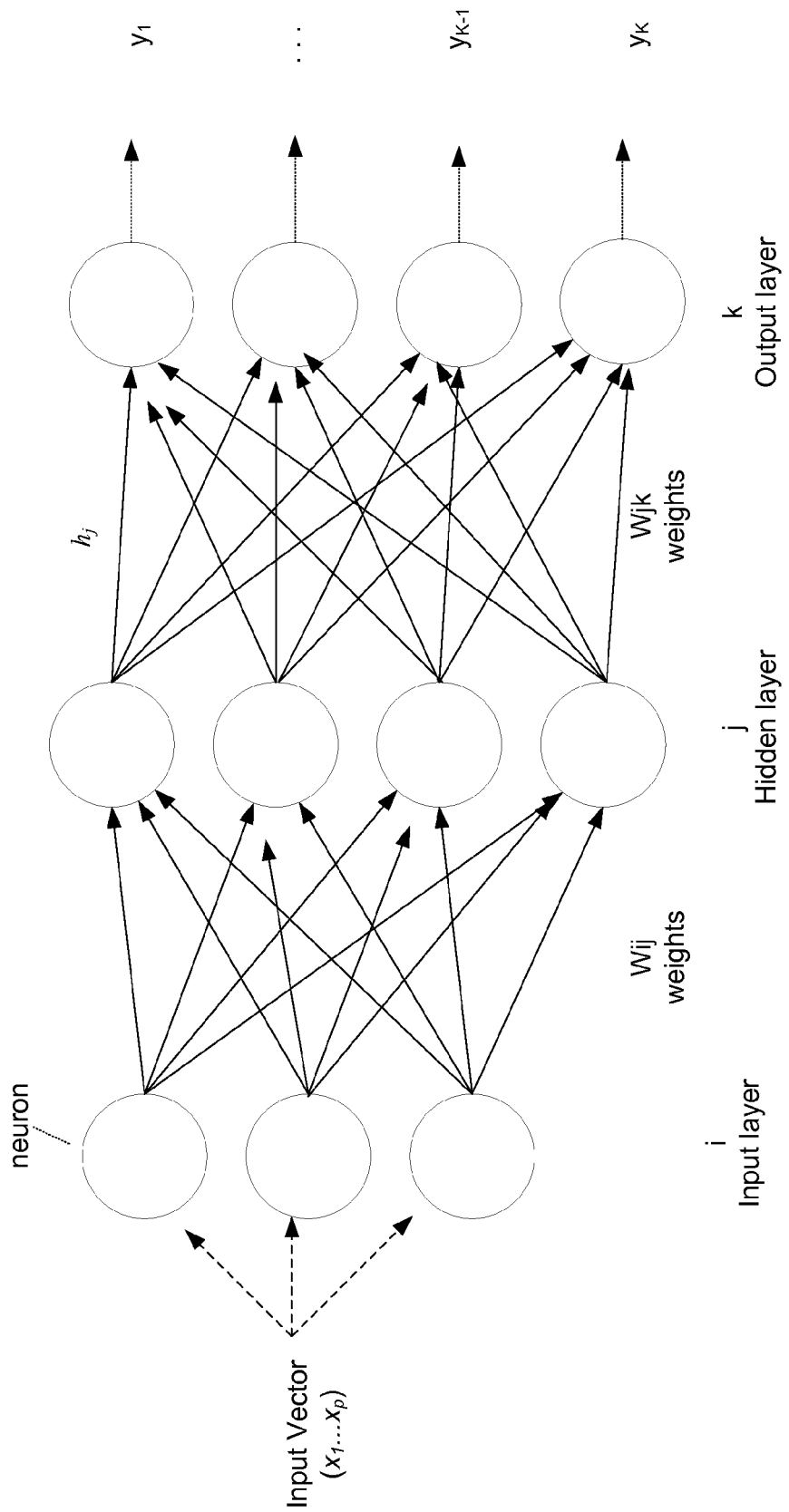
FIG. 1 is a schematic illustration of a neural network with three layers of neurons.

For convenience in description herein, the term "matrix," which usually refers to a two-dimensional array of elements, may be used herein to also refer to a vector, which usually refers to a one-dimensional array of elements.

The term "speech recognition" in some usages may refer to recognition of what is said. Speech recognition finds use in voice user interfaces, for example, voice dialing, domotic appliance control, search data entry, speech-to-text processing, etc. In contrast to speech recognition, in some usages the term "voice recognition" may refer to finding the identity of who is speaking rather than what they are saying. Voice recognition finds use, for example, in speech translation or dictation systems that have been trained on specific persons' voices and in authentication or verification systems that are based on the identity of a speaker as part of a security process. In such usages, speech recognition may be referred to as speaker-independent voice recognition. However, both speech recognition and voice recognition may involve analysis and matching of input audio data to reference sounds. For convenience, the term speech recognition is used herein as a more general term to include aspects of voice recognition in addition to recognition of what is said, as may be appropriate in context.

Speech recognition may be formulated as a multi-leveled pattern recognition problem in which audio signals are structured into a hierarchy of levels (e.g., phonemes, words, phrases, and sentences). At each level, a sound signal may be broken in smaller more basic sub-sound units or features. At the lowest levels, where the sound units or features are the most fundamental (e.g., phonemes), probabilities determine what sound the acoustic signal features should represent. Speech recognition algorithms may be based on suitable statistical acoustical models (e.g., hidden markov model, segmental models, super-segmental models, and hidden dynamic models, neural networks, maximum entropy models, and (hidden) conditional random fields, etc.) and use statistical techniques such as data clustering, smoothing of probability distributions, decision tree method of equivalence classification, use of information measures for goodness criteria, entropy and maximum entropy probability estimation.

Attention is directed here to speech recognition approaches that use a neural network model for probability computation. In such approaches, a properly-trained multi-layer neural network may be used for pattern recognition at each level.

An example speech recognition process using a neural network as an acoustic model may involve four steps. A first step may involve sampling and digitization of raw speech input at a high frequency (e.g., at 16 KHz for speech over a microphone or 8 KHz for telephone speech). A second step may involve analysis of the spectral-domain content of the speech input to extract representative features (e.g., regions of strong energy at particular frequencies) of the speech. These features may be computed, for example, every 10 msec, in time sections (e.g., 25 msec) called speech "frames". A third step may involve using a neural network to classify a set of the features in each speech frame into phonetic-based categories. A fourth step may involve matching the neural network output to reference sounds, words, phrases or sentences using, for example, a language model or grammar file.

The remainder of the description herein relates mostly to the third step i.e. using a neural network to classify a set of the features in each speech frame into phonetic-based categories.

Using a neural network to classify a set of the features in each speech frame into phonetic-based categories may involve applying weighted and biased numeric input to interconnected neurons in the neural network and computing their output. The weights and bias applied to each neuron in the neural network may be obtained by training the neural network using, for example, machine learning or other learning techniques. The neurons in the neural network may be organized in two or more layers including at least an input layer and an output layer. For a multi-layered neural network, the output from one layer may serve as input to the next layer. The layers with no external output connections may be referred to as hidden layers. The mobile speech recognition applications described herein may deploy trained "deep" neural networks (DNN) that have a plurality of hidden layers (e.g., 3 to 8 hidden layers).

FIG. 1 shows an example computation of a neural network with three layers of interconnected neurons. The output of each neuron is a function of the weighted sum of its inputs plus a bias. To classify an input audio frame, a vector of feature values $(x_1 \ldots x_N)$ is applied as input to each neuron in the input layer. The input layer distributes the values to each of the neurons in the hidden layer. Arriving at a neuron in the hidden layer, the value from each input neuron is multiplied by a weight ($w_{jk}$), and the resulting weighted values are summed together and added to a weighted bias value producing a combined value. The combined value is passed through a transfer or activation function, which outputs a value $h_j$. Next, the outputs from the hidden layer are distributed to each of the neurons in the output layer of the neural network. Arriving at a neuron in the output layer, the value from each hidden layer neuron is multiplied by a weight ($w_{kj}$), and the resulting weighted values are summed together and added to a weighted bias value to produce a combined value. The combined value is passed through the transfer or activation function, which outputs a value $y_k$. They values are the outputs of the neural network.

Using mathematical symbols for vectors and matrices, the output of two-layer neural network may be represented as a vector $Y=P(A \cdot X+B)$, where A is a weighing matrix, X is the input matrix or vector, B is a bias vector, and P is an activation function. Computationally, output Y may be obtained by performing a matrix multiplication $(A \cdot X)$ operation, adding the bias vector to the multiplication result, and passing the result through the activation function P( ) The output Y of a multi-layer neural network (e.g., a five layer neural network) may be computed recursively using output of each layer ($H_i$) as input for the next layer as follows:

$H_0=P_0(A_0X+B_0)$ $H_i=P_i(A_iH_{i-1}+B_i)$ for $i=1$ to 3

$Y=P_4(A_4H_3+B_4)$.

Figure 2:
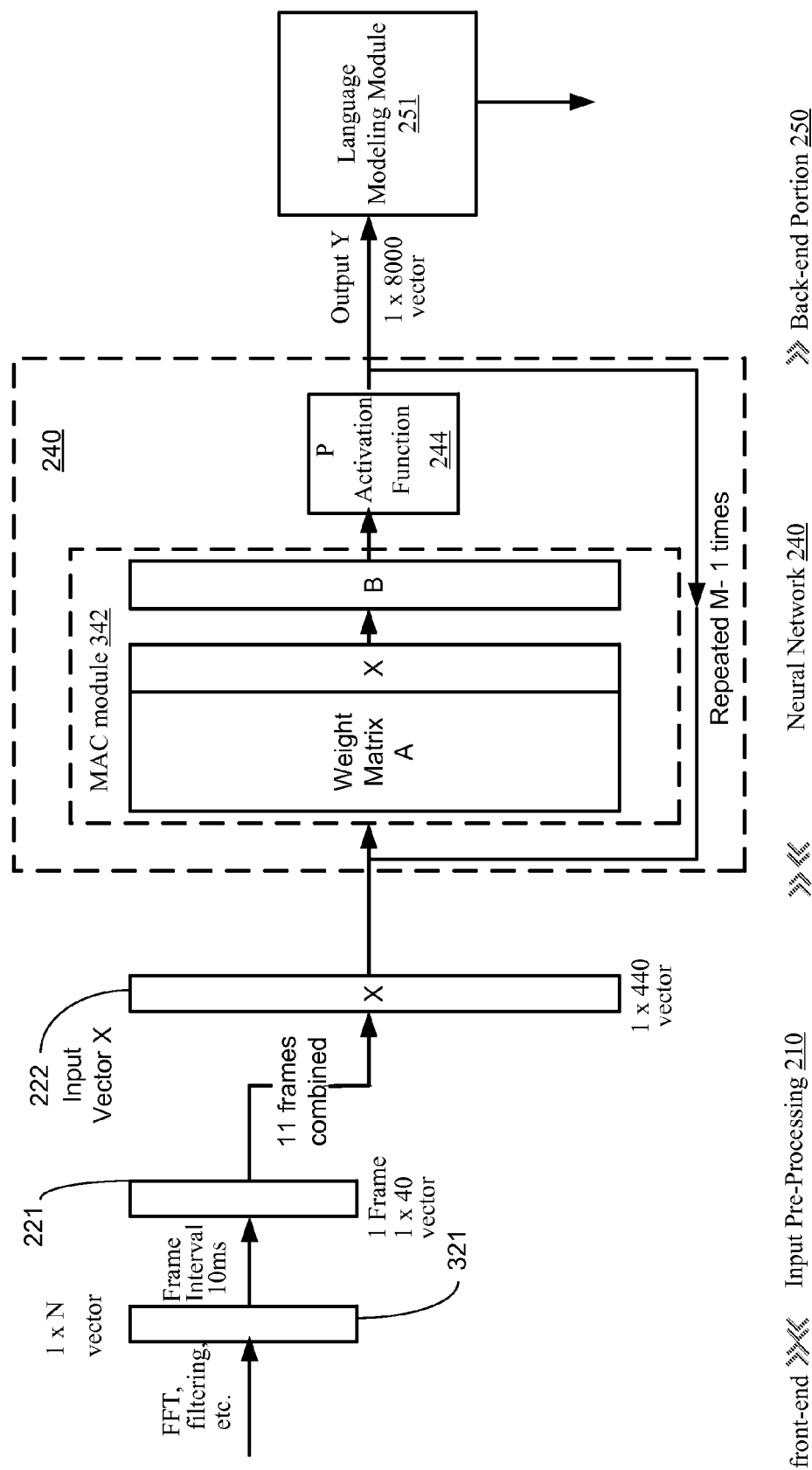
FIG. 2 is a block diagram illustration of a computational algorithm for classifying features of an audio signal through a neural network model for a mobile speech recognition application, in accordance with the principles of the disclosure herein.

FIG. 2 is a block diagram illustration of a computational algorithm 200 for classifying features of an audio signal through a neural network 240 for a mobile speech recognition application, in accordance with the principles of the disclosure herein. Algorithm 200 may include an input pre-processing portion 210 for preparing input to neural network 240 and a back-end portion 250 to further process the output of neural network 240.

The mobile speech recognition application may include a front-end portion (not shown) to sample or window the audio signal (e.g., using a 25 ms Hanning window every 10 ms), and perform spectral-domain analysis of the windowed signal to identify features that represent the spectral-domain content of the audio signal. The spectral-domain analysis may, for example, include Fast Fourier Transforms (FFT), filtering, taking the log-energy of the filtered output.

Input pre-processing portion 210 of algorithm 200 may compute frames 221 of suitable width (e.g., 25 msec wide) at suitable intervals (e.g., every 10 ms) by extracting a set of N features (e.g., 40 features) from the spectral-domain content of the audio signal to form a 1×N vector representing each speech frame 221. Input preprocessing portion 210 may further stack several of these frames (e.g., 11 frames) together to form input vector 222 ("X"). As stacked, input vector 222 may have floating number values, which may be converted to integer number values by pre-processing portion 210 before being input to neural network 240. In some versions of algorithm 200, a number (e.g., T) of 1×N input vectors 222 may be batched together to form an input matrix of size of T×N as a batch input to neural network 240.

Neural network 240 deployed by the mobile speech recognition application may be a multiple-layered deep neural network, for example, with M layers of neurons (e.g., 3 to 8 layers). Each of the M layers may, for example, include anywhere from a 100 to over 2500 neurons. It will be understood that weights and bias terms for neural network 240 may be obtained by training the neural network prior to its use in the mobile speech recognition application.

In algorithm 200, each layer of neural network 240 may be computed through a multiple-accumulate (MAC) module 242 and a curve-fitting or activation function 244 operation as P (AX+B), where X is the input matrix or vector, and where A, B and P are the weight matrix, the bias vector and the activation function, respectively, for the layer. Activation function 244 used in algorithm 200 for the layer may be any suitable type of activation function (e.g., a sigmoid function, a signum function, a threshold function, a piecewise-linear function, a step function, a tanh function, etc.), which controls the amplitude of the output of the layer to be between certain values (e.g., between 0 and 1 or between −1 and 1). Different types of activation functions may be used for different layers of the multi-layer neural network. The output Y of the multi-layer neural network may be computed recursively through MAC module 242 using output of each layer as input for the next layer.

Output Y of neural network 240 may be processed further in back-end portion 250 of algorithm 200. Output Y may, for example, be fed to a speech decoder (e.g., language modeling module 251), which may search through a store of possible candidate words and phrases to match output Y to a sound probabilistically.

In an example implementation algorithm 200, the number of representative features of the audio signal selected for frame 221 may be 40. Each frame 221 may be a 1×40 vector and 11 successive frames may be stacked or combined to form a (1×440) input vector 222. For a (1×440) input vector 222, output Y of neural network 240 may be a 1×8000 vector.

Further curve-fitting or activation function 244 may be implemented as a piecewise quadratic approximation to an activation function (e.g., a sigmoid function or other type of activation function) over, for example, 16 pieces.

It will be understood that algorithm 200 is computationally intensive. For an example five-layer neural network 240 having 7971 neurons, weighing matrix A and bias vector B for the first layer may include (440×2560) weighing coefficients and 2560 bias terms, respectively; for the second to fourth layers (2560×2560) weighing coefficients and 2560 bias terms, respectively; and for the last layer (2560×7971) weighing coefficients and 7971 bias terms, respectively. The total amount of data processed through algorithm 200 for each frame of an audio signal may be on the order of about 41349920 bytes. At a frame interval of 10 ms, fetching of the weighing coefficients and bias terms from data buffers or memory alone may result in an average busload of 4135 MB/s.

Applicant and Assignee have used server-side implementations of algorithm 200 and similar neural-network based algorithms to demonstrate a speech recognition solution for mobile devices. In the server-side implementations, recorded audio signal may be sent by a mobile device over its network connections to the server. The server may process the recorded audio using algorithm 200 (or similar neural-network based algorithms) and return accurate speech recognitions to the mobile device subject to the latencies of the network connections of the mobile device.

Figure 3:
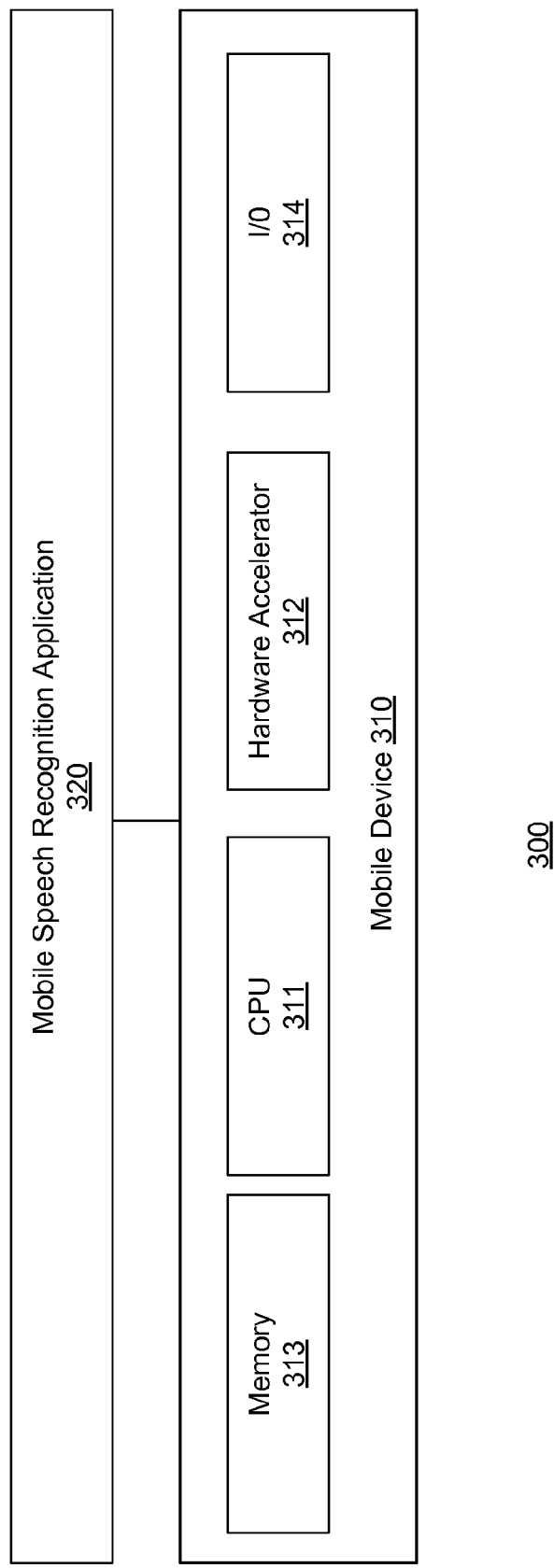
FIG. 3 shows an example system for a client-side implementation of a neural network model of a mobile speech recognition application, in accordance with the principles of the disclosure herein.

In contrast to server-side implementations, FIG. 3 shows an example system 300 for a client-side implementation of a neural network for a mobile speech recognition application, in accordance with the principles of the disclosure herein.

In system 300, a neural-network based mobile speech recognition application 320 may be hosted on a mobile device 310 (e.g., a cell phone or smart phone) that includes a CPU 311 coupled to a hardware accelerator 312, a memory 313 and an I/O unit 314. Hardware accelerator 312 may be configured to perform the processor-intensive calculations (e.g., algorithm 200) that are required for neural network computations. Hardware accelerator 312 may be implemented, for example, in silicon as an ASIC IP core or as a FPGA. Mobile speech recognition application 320 may use an M-layer neural network (e.g., neural network 220) as an acoustic model to classify audio input. Instead of relying on remote servers for server-side implementations of algorithm 200, mobile speech recognition application 320 may use hardware accelerator 312 embedded in mobile device 310 to compute the M layers of the neural network locally in mobile device 310.

Figure 4:
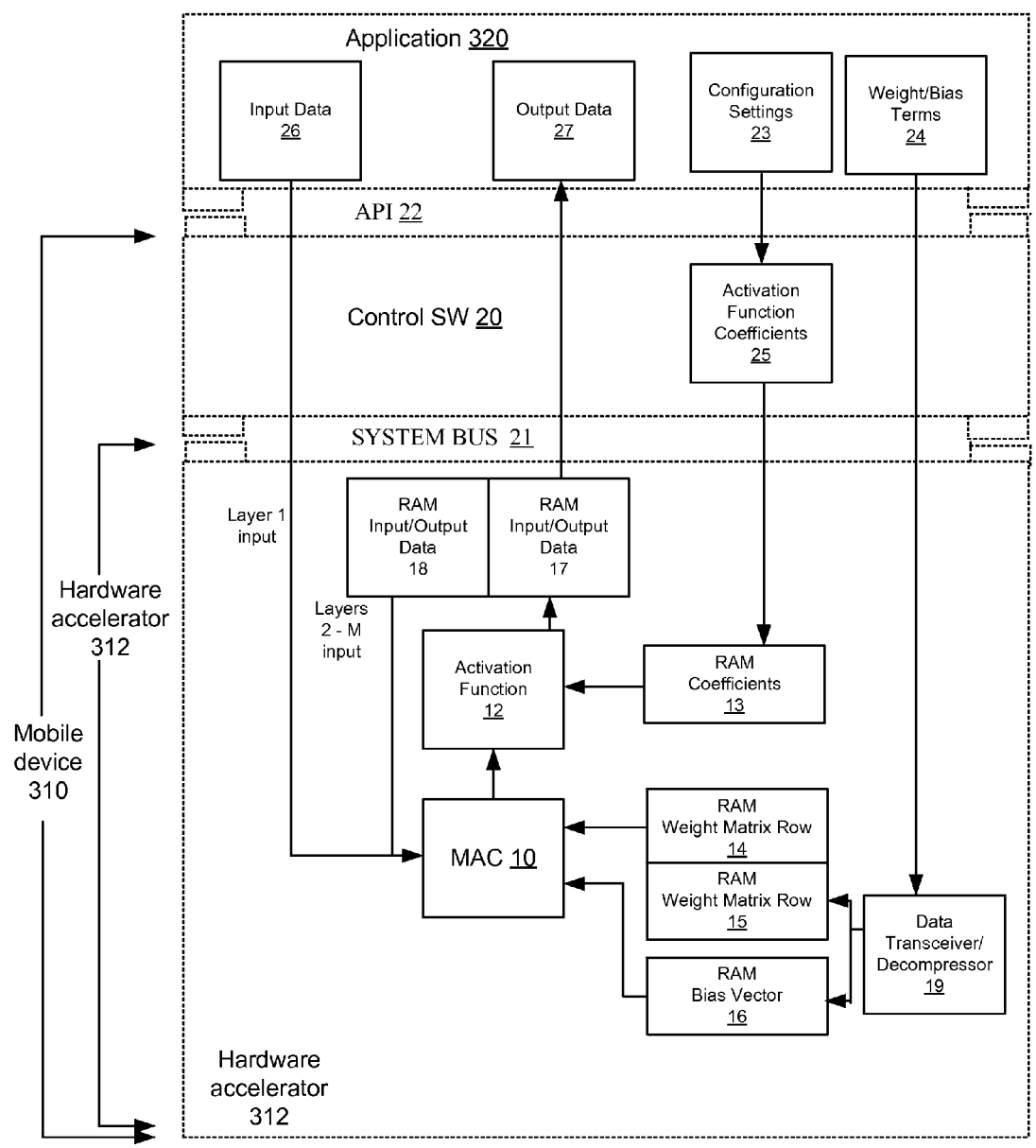
FIG. 4 is schematic illustration of an example arrangement of various components and sub-components of the system of FIG. 3, in accordance with the principles of the disclosure herein.

FIG. 4 is schematic block diagram illustration of an example arrangement 400 of various components and sub-components of system 300 in which mobile speech recognition application 320 is supported on an API 22 of mobile device 310. For clarity, the figure does not show software components of application 320 that may be involved in front-end processing (e.g., signal sampling) to prepare input data 26 (e.g., speech or audio frames) for hardware accelerator 312 or other software components that may be involved in post-end processing (e.g., language modeling) of output 27 returned by hardware accelerator 312 to application 320. The figure shows only the software components (e.g., configuration settings 23, weight and bias terms 24, input data 26 and output data 27) of application 320 that may be directly relevant to the use of hardware accelerator 312. Further, the figure depicts, for example, an RTL version of hardware accelerator 312.

In arrangement 400, hardware accelerator 312 may include a MAC unit 10 to carry out matrix multiply and add operations, an activation function unit 12 to apply an activation function to the output of MAC unit 10, and a data transceiver/decompessor unit 19 configured to receive and decode compressed or uncompressed weights and bias terms data (e.g., weights and bias terms 24) streamed to it, for example, by application 320. Data transceiver/decompressor unit 19 may include decompression circuitry configured to decompress any compressed weights and bias terms that may be included in the data supplied by application 320. Hardware accelerator 312 may also include various buffers or registers (e.g., RAMs 13-18) to store, for example, weights, bias terms, activation function co-efficients, input data, and intermediate output data, etc. The weights may be double buffered, for example, to allow parallel data decompression and MAC operations by decompressor unit 19 and MAC unit 10.

In arrangement 400, mobile device 310 may include a control software layer (e.g., control SW 20) to control operation of hardware accelerator 312 via a system bus 21. System bus 21 may be a standard bus interface such as the AMBA, AHB or AXI. System bus 21 may, for example, contain a DMA engine for accessing external memory, and memory-mapped registers that host CPU 311 may use to control and enable hardware accelerator 312.

In operation, application 320 may supply configuration settings (e.g., configuration settings 23) to control SW 20 to prepare hardware accelerator 312 for classifying input data 26 according to the application's neural network model. The configuration settings may, for example, specify neural network parameters such as a number of layers in the neural network, weight matrix dimensions, activation function type (e.g., sigmoid function), and approximation type (e.g., piecewise quadratic), etc. Based on the supplied configuration settings, control SW 20 may, for example, generate coefficients (e.g., activation function coefficients 25) for a piecewise quadratic approximation to an activation function that may be used as the activation function in the neural network computations. Alternatively, application 320 may itself supply coefficients 25 for the piecewise quadratic approximation. Control SW 20 may in turn transmit the received or generated coefficients 25 to be stored in RAM 13 in hardware accelerator 312 for use by activation function unit 12.

Application 320 may also supply matrix weight and bias terms 24 for the neural network computations to hardware accelerator 312 via control SW 20. Weight and bias terms 24 may be supplied in compressed form to reduce bus loading (e.g., of system bus 21). The compressed weight and bias terms may be decompressed by decompressor 19 and stored or buffered in RAMs 14-16 for use by MAC unit 10 for the matrix multiply and accumulate operations.

In the following description, reference may be made to algorithm 200 (FIG. 2) as an example of the calculations that may be performed by hardware accelerator 312 for mobile speech recognition application 320.

With reference to FIGS. 2 and 3, in operation, hardware accelerator 312 may start calculations to classify an input frame (e.g., input matrix 26) through a layer of the neural network by caching activation function coefficients 25 in memory (e.g., in RAM 13), and decoding or decompressing a weight matrix and bias terms for the layer received from external memory (e.g., weight and bias terms 24) into separate internal memory buffers (e.g., RAMs 14, 15 and 16). For calculations that are performed weight matrix mw-by-mw as $A_{row}*X_{col}+B_{col}$ by MAC unit 10, at least one row of the weight matrix and one column of the bias matrix may be buffered at a time. Similarly, at least one column of input matrix 26 may be cached or buffered at a time (e.g., in RAM 18). For an input batch size of T=1, input and bias vectors (X and B) may be buffered in their entireties. For larger input batch sizes (e.g., T<=8), input matrix X also may be buffered in its entirety. Such buffering of input matrix X in its entirety may allow the weight matrices to be transmitted only once per batch over system bus 21.

After the buffers are loaded with data, MAC unit 10 may perform a multiply-accumulate operation by multiplying a weight matrix row with the input matrix, adding the bias vector and accumulating the result. In parallel with this MAC operation, decompressor 19 may begin to decompress the next weight matrix row. The output of MAC unit (e.g., an N-bit integer) may be processed through activation function unit 12 and the result (e.g., in 8-bit integer) stored into an intermediate output buffer (e.g., RAM 17-18). Once all rows of the weight matrix for the layer are processed, hardware accelerator 312 may start processing a next layer of the neural network by fetching a new bias vector, starting to decode the next weight matrix, etc., and using the preceding layer's output circulated through internal memory as MAC input for the next layer. For the last layer of the neural network, the output of MAC unit 10 may be returned to application 320 as output 27.

After all layers M of the neural network are processed and output 27 is returned, hardware accelerator 312 may raise an interrupt. In response, control SW 20 may reset hardware accelerator 312 to prepare for processing the next input frame.

Arrangement 400 in FIG. 4 shows hardware accelerator 312, for example, as having a single MAC unit 10. In practice, hardware accelerator 312 may have a plurality of MAC units 10 for achieving real-time speech recognition. As previously noted, algorithm 200 may involve a large number of multiplications per second (e.g., ~4.13 Gmps). For a system running at 100 MHz, this number of multiplications corresponds to 41.3 multiplications per cycle not including any overhead from control SW 20 or other parts of system 300. An example system with a 100 MHz bus, 1-cycle multiplication with a load target of 50%, may be estimated to require at least 83 parallel MAC units 10 to process an input frame 221 fully in the time interval (e.g., 10 ms) before next input frame 221 arrives.

It is further noted that for algorithm 200, the total amount of data (weight matrices, bias vector, input data and output data) transferred over the bus to process one frame (assuming pipelined processing, i.e. all layers processed in one pass) by hardware accelerator 312 may be about 41349920 bytes. This amount of data for a frame interval of 10 ms corresponds to about 4135 MB/s average busload. This busload may be reduced by batch processing of frames. For a batch size of T, the effective busload generated by the weight matrices and bias vectors may scale by a factor of about 1/T because for N frames the weight matrices may have to fetched only N/T times. For a batch size of T=8, the average busload for the uncompressed data would be around 520 MB/s. A compression factor of K (e.g., 0.57) applied to the weight matrices may further reduce the average busload to about 300 MB/s.

To process the large busload of data transmitted, decompressor 19 may, for example, include a number of parallel stream decoders running in parallel to decompress the weight matrices bitstream. A single weight matrix row may be divided into P partitions equally for P parallel stream decoders. The bitstream may be interleaved to B bits ("chunk") for each partition to allow storing and reading the bitstream from a single point. A de-interleaver in decompressor 19 may feed each of the P parallel stream decoders with its own partition.

It is further noted that in arrangement 400 of system 300, internal memories (e.g., RAMs 14-18) in hardware accelerator 312 may have to be sufficiently large to store, for example, at least 163,840 bits for a row of weight matrix. RAMs 14 and 15 may be configured to provide double buffering to allow for parallel decompressing and MACs. Similarly RAMs 17 and 18 may provide the double buffering that may be needed to use the output of MAC unit 10 for a layer as input for the next layer.

The use of internal on-chip RAMs (e.g., RAMs 14-18) in hardware accelerator 312 may be avoided or reduced by using a FIFO scheme to transmit weight coefficients and bias vectors inside hardware accelerator 312 via a FIFO register element. Such a scheme may be practical because each weight matrix and bias vector element is used only once per classification by MAC unit 10.

Figure 5:
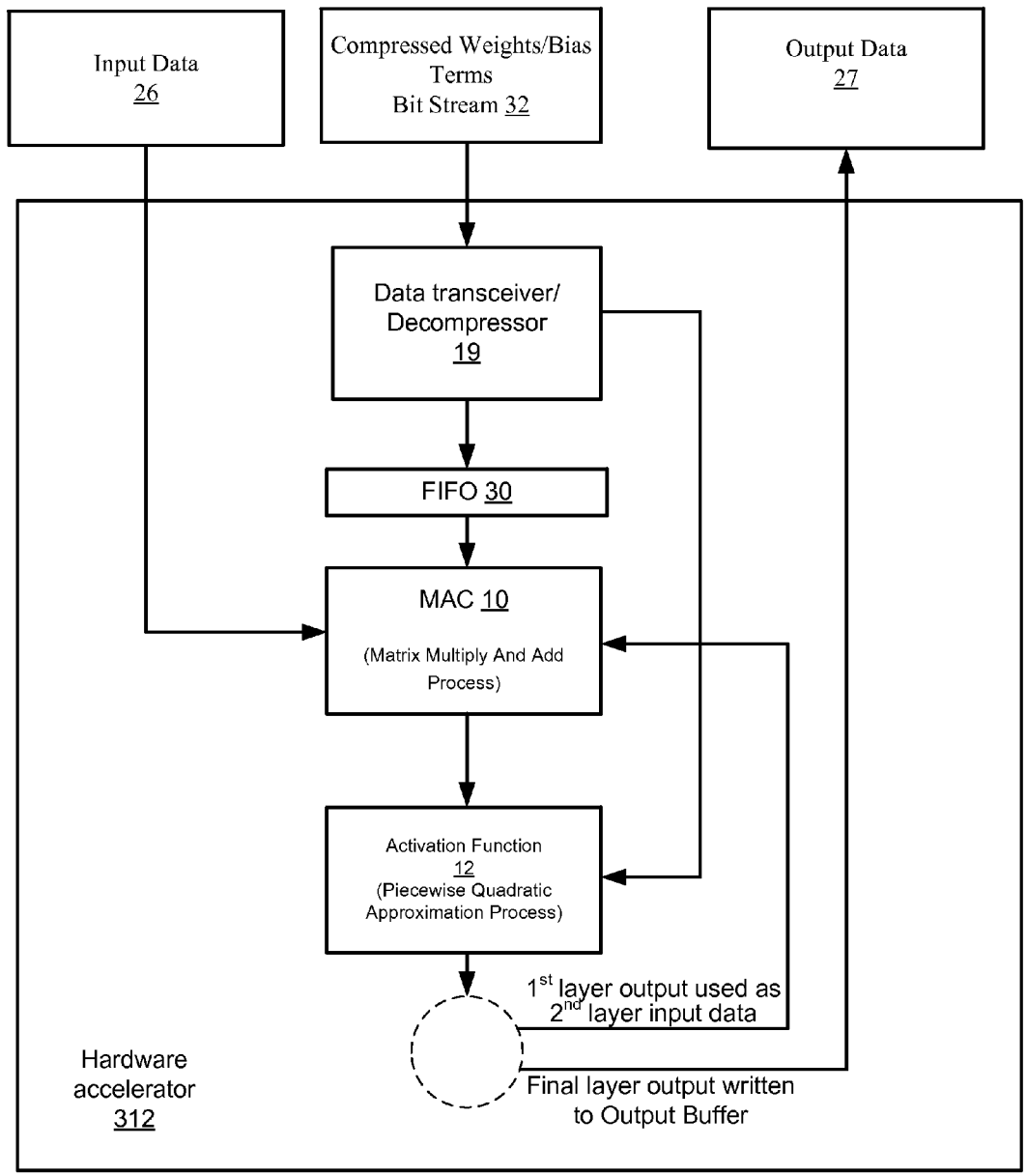
FIG. 5 is schematic illustration of another example arrangement of various components and sub-components of the system of FIG. 3, in accordance with the principles of the disclosure herein.

FIG. 5 shows an example arrangement 500 of various components and sub-components of system 300 that utilizes a FIFO scheme for transmitting weight coefficients and bias vectors inside hardware accelerator 312. In arrangement 500, a FIFO register 30 is disposed in hardware accelerator 312 between decompressor 19 and MAC 10. In arrangement 500, application 320 may be configured to compress weight matrix coefficients, bias vector values and approximation function coefficients into a single bitstream 32 sent to hardware accelerator 312. The weights, biases and approximation function coefficients for all M layers of the neural network model may be packed into the same bitstream. Data transceiver/decompressor 19 may be configured to this decode this bitstream and extract the payload layer-by-layer. Data transceiver/decompressor 19 may be further configured to push the decoded weight matrix coefficients and bias vector terms for a first layer (e.g., layer 1) into FIFO register 30 from where they can be read or fetched by MAC 10 processes. Data transceiver/decompressor 19 may further transmit the decoded approximation function coefficients directly to activation function unit 12 for use in a piecewise quadratic approximation process.

In operation, for example for a 2-layer neural network, an input vector for the first layer (e.g., layer 1) classification may be read from a separate buffer (input data 26) and fed into the MAC 10 process for the first layer. Once the output of the first layer is calculated, Data transceiver/decompressor 19 may start decoding or decompressing data for the next layer (e.g., layer 2) from the bitstream. The output of the first layer may be used as input for the MAC 10 processes for layer 2. In general for an M-layer neural network, the processes may be repeated until all M layers in the neural network have been calculated. The output of the last layer in the neural network may be transmitted to an output buffer (e.g., Output Data 27).

Designs of the "MAC" hardware accelerators (e.g., hardware accelerator 312) for mobile speech recognition that are described herein may be implemented as ASIC IP cores or sub-components of larger ASICs. The MAC hardware accelerators may be used to perform the computationally intensive matrix multiplication and accumulate operations for neural network modeling that mobile device CPUs (e.g., CPU 311) may be unable to carry out, for example, due to performance or power considerations. The MAC hardware accelerators/ASIC IP cores may be connected to other mobile device system components via a standard bus interface. The MAC hardware accelerators/ASIC IP cores may can independently perform multiply and accumulate operations as requested by the CPU (e.g. "classify an audio frame"), and interrupt the CPU once done. ASIC IP cores may be hardwired designs or they may contain programmable logic. Alternatively, the designs of the "MAC" hardware accelerators for large neural networks may be integrated as a drop-in solution in CPU design or as a co-processor (FPGA).

Figure 6:
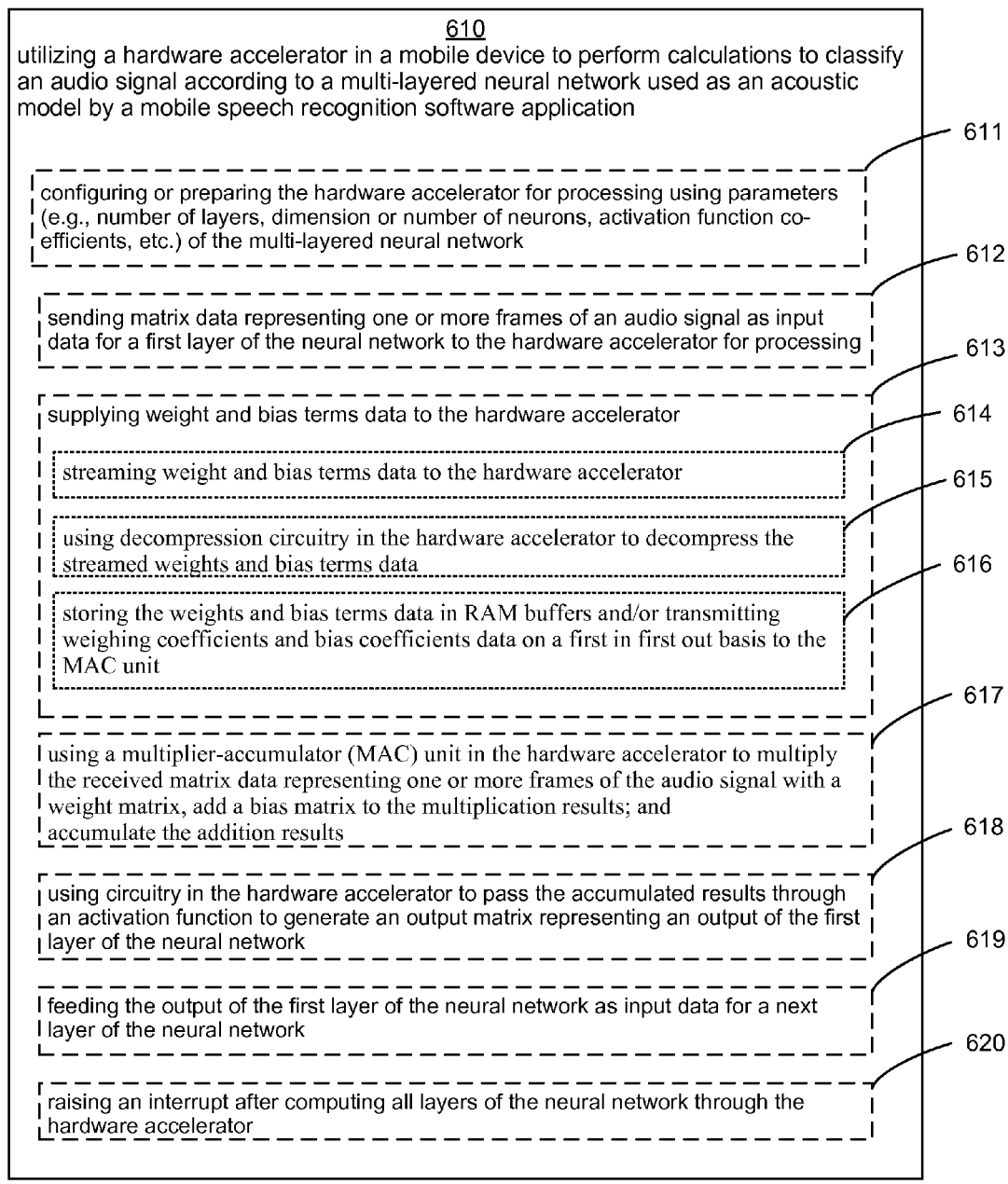
FIG. 6 is a flowchart illustrating an example method for executing a mobile speech recognition software application on a mobile device, in accordance with the principles of the disclosure herein.

FIG. 6 is a flow chart illustrating an example method 600 for executing a mobile speech recognition software application on a mobile device, in accordance with the principles of the disclosure herein.

Method 600 includes utilizing a hardware accelerator in the mobile device to perform calculations to classify an audio signal according to a multi-layered neural network used as an acoustic model by the mobile speech recognition software application (610). Utilizing the hardware accelerator includes configuring or preparing the hardware accelerator for processing using parameters (e.g., number of layers, dimension or number of neurons, activation function co-efficients, etc.) of the multi-layered neural network (611), sending matrix data representing one or more frames of an audio signal as input data for a first layer of the neural network to the hardware accelerator for processing (612), and supplying weight and bias terms data to the hardware accelerator (613).

The method further includes using a multiplier-accumulator (MAC) unit in the hardware accelerator to multiply the received matrix data representing one or more frames of the audio signal with a weight matrix, add a bias matrix to the multiplication results, and accumulate the addition results (617), and using circuitry in the hardware accelerator to pass the accumulated results through an activation function to generate an output matrix representing an output of the first layer of the neural network (618). Method 600 may include feeding the output of the first layer of the neural network as input data for a next layer of the neural network (619), and raising an interrupt after computing all layers of the neural network through the hardware accelerator (620).

In method 600, the activation function used for the neural network may be any suitable type of activation function (e.g., a sigmoid function or other step-like function). The method may include applying the activation function in a piecewise quadratic approximation (618). Further in method 600, supplying weight and bias terms data to the hardware accelerator 613 may include streaming compressed or uncompressed weight and bias terms data to the hardware accelerator (614) and using decompression circuitry in the hardware accelerator to decompress the streamed weights and bias terms data if compressed (615). Method 600 may include storing the weights and bias terms data in RAM buffers and/or transmitting weighing coefficients and bias coefficients data on a first in first out basis to the MAC unit (616).

Method 600 may include implementing the hardware accelerator as an Application Specific Integrated Circuit (ASIC) core or as a field-programmable gate array (FPGA).

Figure 7:
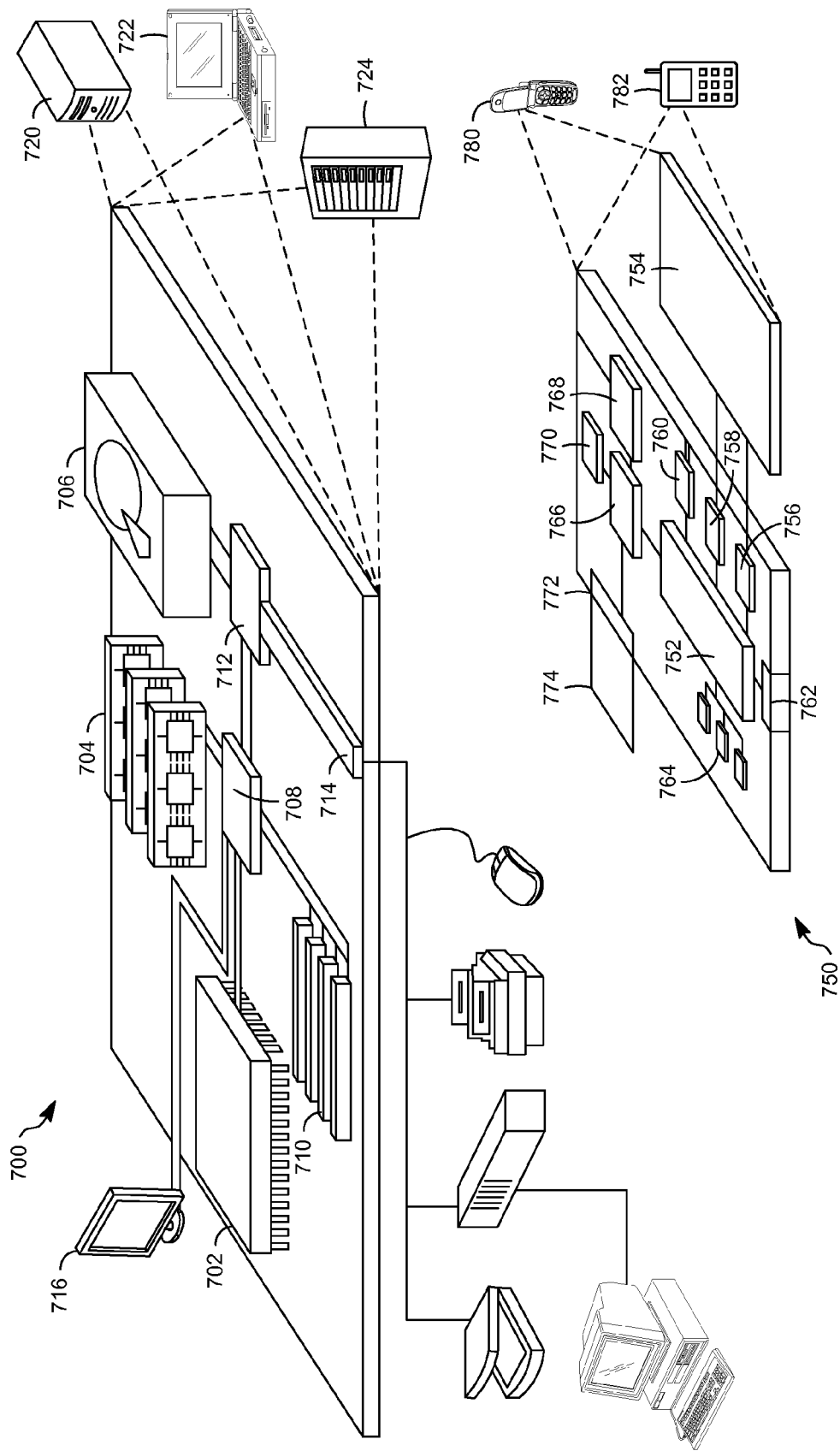
FIG. 7 is a schematic illustration of a generic computer device and a generic mobile computer device, which may be used with the techniques described herein.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM speech calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from speech telephone calls, may include recorded sound (e.g., speech messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the disclosure herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A mobile computing device, comprising;
   a processor configured to execute a speech recognition application that uses a multi-layered neural network as an acoustic model; and
   a hardware accelerator comprising:
      circuitry configured to receive matrix data representing one or more frames of an audio signal as input data for a first layer of the neural network;
      a multiplier-accumulator (MAC) unit configured to:
         multiply the received matrix data representing one or more frames of the audio signal with a weight matrix;
         add a bias matrix to the multiplication results; and
         accumulate the addition results;
      circuitry configured to pass the accumulated results through an activation function to generate an output matrix representing an output of the first layer of the neural network for the frame; and
      a data transceiver configured to receive and decode weights and bias terms data, the data transceiver including:
         a decompression unit configured to:
            decompress compressed weight and bias terms data, and
            double buffer decompressed weights and bias terms data to allow for parallel decompression and MAC unit operations.

2. The mobile computing device of claim 1, further comprising, a streaming unit configured to stream weights and bias terms data to the hardware accelerator.

3. The mobile computing device of claim 1, wherein the hardware accelerator includes RAM buffers to store the decoded weights and bias terms.

4. The mobile computing device of claim 1, wherein the data transceiver circuitry is configured to transmit decoded weighing coefficients and bias coefficients data on a first in first out basis via a FIFO register to the MAC unit.

5. The mobile computing device of claim 1, wherein the activation function is one of a sigmoid function, a signum function, a threshold function, a piecewise-linear function, a step function, and a tanh function.

6. The mobile computing device of claim 1, wherein the circuitry configured to pass the accumulated results through an activation function is configured to apply the activation function in a piecewise quadratic approximation.

7. The mobile computing device of claim 1, wherein the hardware accelerator is configured to feed the output of the first layer of the neural network as input data for a next layer of the neural network.

8. The mobile computing device of claim 1, wherein the hardware accelerator is further configured to raise an interrupt after computing all layers of the neural network.

9. The mobile computing device of claim 1, wherein the hardware accelerator is implemented as an Application Specific Integrated Circuit (ASIC) core.

10. The mobile computing device of claim 1, wherein the hardware accelerator is implemented as a field-programmable gate array (FPGA).

11. A method for executing a speech recognition software application on a mobile device, the method comprising:
utilizing a hardware accelerator in the mobile device to perform neural network calculations to classify an audio signal, wherein utilizing the hardware accelerator includes:
sending matrix data representing one or more frames of an audio signal as input data for a first layer of a neural network to the hardware accelerator;
using a multiplier-accumulator (MAC) unit in the hardware accelerator to:
multiply the received matrix data representing one or more frames of the audio signal with a weight matrix;
add a bias matrix to the multiplication results; and
accumulate the addition results; and
using circuitry in the hardware accelerator to pass the accumulated results through an activation function to generate an output matrix representing an output of the first layer of the neural network;
receive and decode weights and bias terms data;
decompress compressed weight and bias terms data; and
double buffer decompressed weights and bias terms data to allow for parallel decompression and MAC unit operations.

12. The method of claim 11 further comprising:
streaming compressed and/or uncompressed weight and bias terms data to the hardware accelerator.

13. The method of claim 11 further comprising:
storing the weights and bias terms data in RAM buffers.

14. The method of claim 11 further comprising:
transmitting weighing coefficients and bias coefficients data on a first in first out basis to the MAC unit.

15. The method of claim 11, wherein the activation function is one of a sigmoid function, a signum function, a threshold function, a piecewise-linear function, a step function, and a tanh function.

16. The method of claim 11 further comprising:
applying the activation function in a piecewise quadratic approximation.

17. The method of claim 11 further comprising:
feeding the output of the first layer of the neural network as input data for a next layer of the neural network.

18. The method of claim 11 further comprising:
raising an interrupt after computing all layers of the neural network through the hardware accelerator.

19. The method of claim 11 further comprising:
implementing the hardware accelerator as an Application Specific Integrated Circuit (ASIC) core.

20. The method of claim 11 further comprising:
implementing the hardware accelerator as a field-programmable gate array (FPGA).

21. A hardware accelerator configured to compute a multi-layered neural network of a mobile speech recognition application, the hardware accelerator comprising:
circuitry configured to receive matrix data representing one or more frames of an audio signal as input data for a first layer of the neural network;
a multiplier-accumulator (MAC) unit comprising:
circuitry configured to multiply the matrix data representing one or more frames of the audio signal with a weight matrix;
circuitry configured to add a bias matrix to the multiplication results;
circuitry configured to accumulate the addition results;
circuitry to pass the accumulated results through an activation function to generate an output matrix representing an output of the first layer of the neural network for the frame; and
a data transceiver configured to receive and decode weights and bias terms data, the data transceiver including:
a decompression unit configured to:
decompress compressed weight and bias terms data, and
double buffer decompressed weights and bias terms data to allow for parallel decompression and MAC unit operations.

22. The hardware accelerator of claim 21 further configured to use the output of the first layer of the neural network as input to the MAC unit for computing the next layer of the neural network.

23. The hardware accelerator of claim 21, further comprising:
memory buffers to store weights and bias terms data.

24. The hardware accelerator of claim 21, wherein the decompression unit is configured to decompress a stream of compressed weight and bias terms to extract weight matrix coefficients row-by-row or column-by-column.

25. The hardware accelerator of claim 24, wherein the decompression unit is further configured to transmit the extracted row-by-row or column-by-column weight matrix coefficients to the MAC unit via a FIFO register.

26. The hardware accelerator of claim 21, wherein the circuitry to pass the accumulated results through an activation function is configured to use a piecewise quadratic approximation to the activation function.

27. The hardware accelerator of claim 21, wherein the activation function is one of a sigmoid function, a signum function, a threshold function, a piecewise-linear function, a step function, and a tanh function.

28. The hardware accelerator of claim 21 implemented as an Application Specific Integrated Circuit (ASIC) core.

29. The hardware accelerator of claim 21 implemented as a field-programmable gate array (FPGA).

30. The hardware accelerator of claim 21 further configured to raise an interrupt after computing all layers of the neural network.

31. The hardware accelerator of claim 21 further comprising a plurality of MAC units configured to operate in parallel to perform at least 1 Giga multiplications per second.

* * * * *